United States Patent
Madduri et al.

(10) Patent No.: US 9,626,177 B1
(45) Date of Patent: Apr. 18, 2017

(54) PEER TO PEER UPGRADE MANAGEMENT

(71) Applicant: Cohesity, Inc., Santa Clara, CA (US)

(72) Inventors: Sashi Madduri, Mountain View, CA (US); Gaurav Garg, Menlo Park, CA (US); Patrick Lundquist, San Francisco, CA (US)

(73) Assignee: COHESITY, INC., Santa Clara, CA (US)

( * ) Notice: Subject to any disclaimer, the term of this patent is extended or adjusted under 35 U.S.C. 154(b) by 0 days.

(21) Appl. No.: 14/852,159

(22) Filed: Sep. 11, 2015

(51) Int. Cl.
*G06F 9/445* (2006.01)
*H04L 29/06* (2006.01)
*G06F 21/62* (2013.01)

(52) U.S. Cl.
CPC .............. *G06F 8/65* (2013.01); *G06F 21/629* (2013.01); *H04L 63/102* (2013.01)

(58) Field of Classification Search
None
See application file for complete search history.

(56) References Cited

U.S. PATENT DOCUMENTS

2004/0003266 A1* 1/2004 Moshir et al. ............... 713/191

* cited by examiner

*Primary Examiner* — Chuck Kendall
(74) *Attorney, Agent, or Firm* — Patterson + Sheridan, LLP

(57) ABSTRACT

A method and apparatus for updating an application on a group of nodes is presented. According to one embodiment, an application is updated at a first node. The first node updates a registry to indicate that an update was performed at the first node and propagates the update to the registry to one or more second nodes. At a second node, the second node determines that one or more application updates are available at the first node. Upon such a determination, the second node requests one or more update packages from the first node. Based on an update policy associated with the second node, the second node updates the application using the one or more update packages.

14 Claims, 8 Drawing Sheets

PEER TO PEER UPGRADE MANAGEMENT

BACKGROUND

Field

Embodiments of the present disclosure generally relate to managing software updates (e.g., upgrades to newer versions of software or downgrades to older versions of software) on computer systems, and more specifically to software update management across peer computing systems in a network.

Description of the Related Art

Software providers often distribute (or otherwise make available) update packages to modify existing installations of an application. These software update packages may include new features, remove unused features, or provide patches to improve software functionality, remedy security vulnerabilities, or fix bugs. In some cases, software providers use a centralized update authority system to distribute software updates. Computer systems query the centralized update authority system to determine whether an update is available. As updates are published, the application typically downloads an update package from the centralized update authority and installs the software update.

Typically, software updates are managed on a system-by-system basis. For each system in a network, a user or system administrator generally initiates a software update process by setting up automatic updates on a regular schedule or by manually obtaining a software update package and installing the obtained software update package on the system. The software update may be installed from a package saved on removable storage (e.g., a USB flash drive, compact disc, DVD, Blu-Ray disc, etc.) or retrieved from a central update repository.

Performing software updates on a system-by-system basis may take time due to various factors. For example, clusters of computer systems may be managed by different administrators. Each administrator may implement a different software update schedule, and thus, software updates on different clusters may not be synchronized. In another case, clusters may move to different data centers, which may present difficulties for an administrator to locate and perform updates on systems in a cluster.

In some cases, certain systems may be down for maintenance or otherwise offline when a system administrator pushes out an update package to a cluster of computer systems or otherwise initiates a software update. Thus, after the system administrator initiates a software update, some systems in the cluster may not be updated. To ensure that software updates are propagated to all systems in a cluster, a system administrator may inspect each system individually and manually install the software update on systems that did not receive the software update.

In another case, some clusters or individual computer systems are not connected to the internet for security reasons. Because these systems do not have internet connectivity, these systems are not able to ping a software update server to determine if software updates are available and download any applicable software update packages. To ensure that clusters or computer systems that are not connected to the internet receive software updates, system administrators may manually install software updates on these systems.

SUMMARY

The present disclosure generally provides a method for updating an application on a group of nodes. The method generally includes updating the application at a first node. The first node updates a registry to indicate that an update was performed at the first node and propagates the update to the registry to one or more second nodes. At a second node, the second node determines that one or more application updates are available at the first node. Upon such a determination, the second node requests one or more update packages from the first node. Based on an update policy associated with the second node, the second node updates the application using the one or more update packages.

Another embodiment includes a computer-readable storage medium having instructions, which, when executed on a processor, performs an operation for updating an application on a group of nodes. The operation generally includes updating the application at a first node. The first node updates a registry to indicate that an update was performed at the first node and propagates the update to the registry to one or more second nodes. At a second node, the second node determines that one or more application updates are available at the first node. Upon such a determination, the second node requests one or more update packages from the first node. Based on an update policy associated with the second node, the second node updates the application using the one or more update packages.

Still another embodiment includes a processor and a memory storing a program, which, when executed on the processor, performs an operation for updating an application on a group of nodes. The operation generally includes updating the application at a first node. The first node updates a registry to indicate that an update was performed at the first node and propagates the update to the registry to one or more second nodes. At a second node, the second node determines that one or more application updates are available at the first node. Upon such a determination, the second node requests one or more update packages from the first node. Based on an update policy associated with the second node, the second node updates the application using the one or more update packages.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
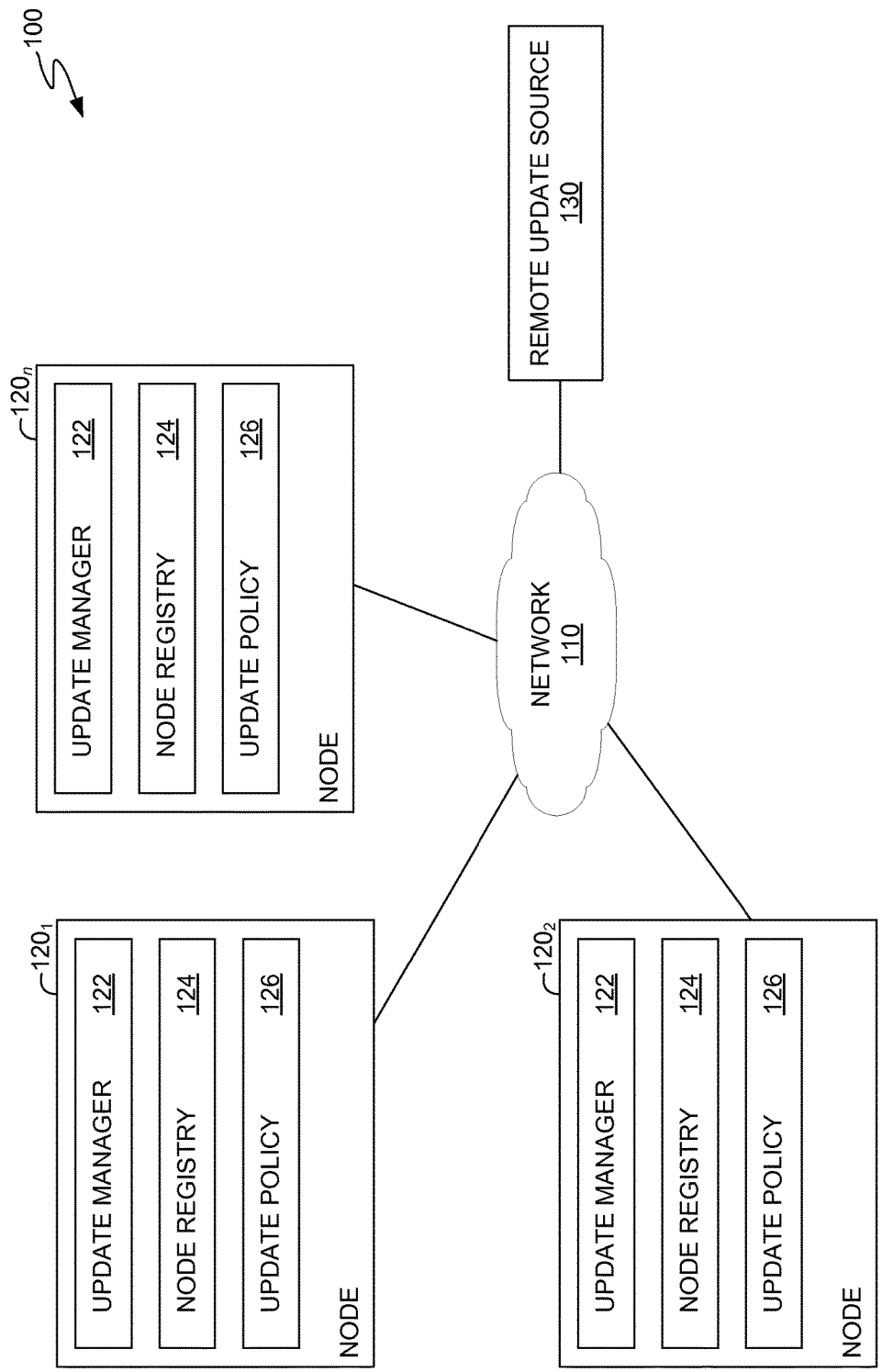
FIG. 1 illustrates an example of a networked computing environment, according to one embodiment.

Embodiments presented herein describe techniques for managing software updates in a cluster of computer systems as well as across different clusters, based on software updates performed on a peer node. Performing software updates based on software updates performed on a peer node generally allows updates to be propagated throughout a network of peer devices. a peer-based update management system may maintain a consistent software configuration for computer systems in a network without manual intervention.

In one embodiment, each node (i.e., computer system) in a network may include a copy of a node registry indicating a software configuration for each node in the network. When a software update (i.e., an upgrade to a newer version of software or a downgrade to an older version of software) is performed on a first node, the first node updates a local copy of the node registry and propagates the change to the node registries stored on the other nodes in the network.

When a second node detects that the software configuration of the first node has changed (e.g., via updated information in the node registry), the second node determines whether to perform the software update based on an update policy governing the second node. If the update policy for a second node allows for an automatic update, the second node obtains a software update package from the first node and performs an update using the obtained software update package. If the update policy requires an administrator to confirm an update, the second node may generate a message requesting a system administrator approve the update. Once approved, the second node obtains the software package from the first node and performs an update using the obtained software package. Otherwise, the software configuration at the second node remains unchanged.

In one embodiment, nodes (i.e., computer systems) in a first cluster may be updated based on software updates performed on nodes in a second cluster. A master node may be designated in both clusters. The master node generally includes a cluster registry which maintains information about a software configuration associated with the nodes in a cluster. That is, the master node specifies a configuration that should be replicated on each node.

A designated master node in the second cluster may determine whether to perform a software update based on the software configuration associated with the nodes in the first cluster. If the cluster registry indicates that a software update has been performed on machines in the first cluster, a node in the second cluster retrieves a software update package from the designated master node in the first cluster. The requesting node in the second cluster completes a software update based on the software update package and propagate the update to other nodes in the second cluster.

Advantageously, using peer-based update management allows for software configuration continuity to be maintained across peer nodes in a network. By managing updates based on updates performed on peer nodes, software updates may be performed, for example, on nodes without manual intervention to perform updates on nodes that were offline or not connected to the internet when a first node is updated. Additionally, by managing updates based on updates performed on peer nodes, nodes need not access a central upgrade authority in order to perform software updates.

FIG. 1 illustrates an example computing environment 100, according to an embodiment. As illustrated, computing environment 100 includes a plurality of nodes 120 and a remote update source 130 connected to a network 110.

Each of the plurality of nodes 120 are peer nodes in the computing environment 100 that may be managed and used independently. Some nodes 120 may be accessible only to peer nodes in a network (e.g., development servers, networked file repositories, etc.), while other nodes 120 may be exposed to the internet. Each node 120 generally includes an update manager 122, node registry 124, and an update policy 126. As described herein, a system administrator may perform a software update (i.e., an upgrade to a newer version of software or downgrade to an older version of software) on one node 120, which may propagate the update to other nodes 120 in the computing environment according to an update policy associated with each node.

Update manager 122 generally obtains a software update package from a source repository and performs a software update based on the obtained software update package. In some cases, a first node $120_1$ may obtain a software update package from a remote update source 130, such as a central update authority, or from removable storage (e.g., a flash drive, compact disc, DVD, or Blu-Ray disc) provided by a system administrator. Other nodes $120_2$-$120_n$, as described in further detail herein, may retrieve a software update package from update manager 122 of the first node $120_1$ to perform a software update.

After update manager 122 obtains a software package and performs the software update based on the obtained software update, update manager 122 updates the entry for associated node 120 in node registry 124 to reflect the software update. For example, the entry may identify a node 120 and list a version number, build number, build date, or other information identifying the software installed on node 120. In some cases, node registry 124 may further include a timestamp that identifies when a software update was applied to node 120.

Node registry 124 may be replicated across nodes 120 in a computing environment and may be synchronized for fault tolerance. In some cases, one node 120 may be designated as a master node (e.g., node $120_1$). As updates are performed on the master node $120_1$, the corresponding updates to node registry 124 are propagated to the other nodes 120 in computing environment 100. Non-master nodes $120_2$-$120_n$ can examine the software configuration information (e.g., version number, build number, build date, etc.) associated with master node $120_1$ to determine whether software installed on master node $120_1$ is different from software installed on non-master nodes $120_2$-$120_n$.

In some cases, no single node 120 necessarily need be designated as a master node. When a software update is performed on a first node 120, the first node 120 updates its entry in node registry 124 to reflect the update. When the updated node registry 124 is propagated to other nodes, the other nodes can search the updated node registry 124 to find information about a software configuration that is different from the software configuration of a node 120 other than the first node. In some cases, node registry 124 may include information about the last software update that was performed on a node in the computing environment 100. When the updated node registry 124 is propagated to other nodes 120 in the computing environment, the nodes can use the information about the last software update to determine whether a software change was performed on a node 120 in the computing environment.

Each node 120 includes an update policy 126. The update policy 126 defines the actions that a node 120 may take when software is updated on a peer node. Update policy 126 may allow a node 120 to automatically perform a software update when another node 120 has been updated, block the node from performing a software update, and/or alert a system administrator that node 120 is requesting a software update. A node 120 may generate an alert, for example, by sending an e-mail to a system administrator or by displaying an alert when a system administrator logs into the node. In some cases, the alert may further include a request for the system administrator to approve a software update. If a system administrator approves the update, the requesting node 120 obtains the software update package from an updated node and executes the software package. Otherwise, if a system administrator does not allow the update, the requesting node 120 remains unchanged. In some cases, if a system administrator does not allow the update to be performed on one node 120, the update may be rolled back on the updated node.

The update policy may differ based on whether the software update is an upgrade to a newer version of software or a downgrade to an older version of software. For example, node 120 may automatically install upgrades to newer versions of software, but may request that a system administrator affirmatively allow a downgrade to an older version of software. In some cases, the update policy may additionally differ based on the purpose or criticality of an update. For example, a node may automatically obtain and execute a software update package for highly critical updates corresponding to program security or important functionality, while less-critical updates or updates that may need to be tested before widespread deployment (e.g., updating software to the most recent release) need not be performed automatically. Additionally, in some cases, whether an update is performed automatically may be defined for different types of programs. For example, update policy 126 for a node 120 may configure node 120 to perform security updates at the operating system level automatically, while moving from one major release to another major release of software may require approval from a system administrator.

Figure 2:
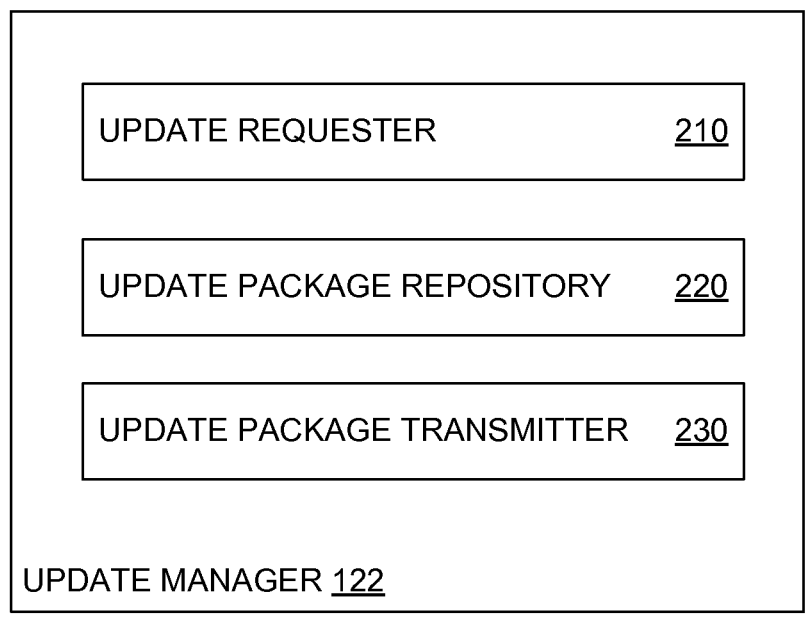
FIG. 2 illustrates a block diagram of an example update manager, according to one embodiment.

FIG. 2 is a block diagram illustrating an example update manager 122, according to an embodiment. As illustrated, as illustrated, update manager 122 includes a update requester 210, an update package repository 220, and an update package transmitter 230.

Update manager 122 at a first node $120_1$ generally communicates with an update manager 122 at a second node $120_2$ to transmit update packages from the first node $120_1$ to the second node $120_2$ when the second node determines that a software update is to be performed. At a first node, update manager receives a request for an update package from update requester 210 at one or more second nodes. Update requester 210 generally generates a request for a particular software update package when a second node $210_2$ determines, based on information in node registry 124, that a software update should be performed. The request generally identifies a particular software update package to be retrieved from the first node and transmitted to the second node. In computing environments with a designated master node (e.g., node $120_1$), update requester 210 at a second nodes $120_2$ through $120_n$ transmit requests for software update packages to the designated master node. In computing environments without a designated master node, update requester 210 at a requesting node generally transmits requests for software update packages to the appropriate node 120 based on, for example, information in node registry 124 indicating the most recently updated node.

One or more software update packages are stored in update package repository 220. In some cases, update package repository 220 may implement a content management system which assigns a unique identifier to each software update package. In some cases, update package repository 220 may store a number of software update packages for the same program, which may allow a system administrator to roll back software to a previous update and propagate the rollback to other nodes in the computing environment.

In some cases, update manager 122 may maintain the update package repository 220 at the designated master node. Backup copies of the update package repository 220 may be maintained at other designated nodes. Where no single node is the designated master node, update manager 122 at each node 122 may maintain an independent update package repository, which may contain update packages initially downloaded to a particular node.

After update manager 122 at a node receives a request for a particular software update package, update package transmitter 230 transmits the requested software update package to the requesting node. At the requesting node, update manager 122 receives the requested software update package and proceeds to perform a software update according to an upgrade policy for the requesting node.

Figure 3:
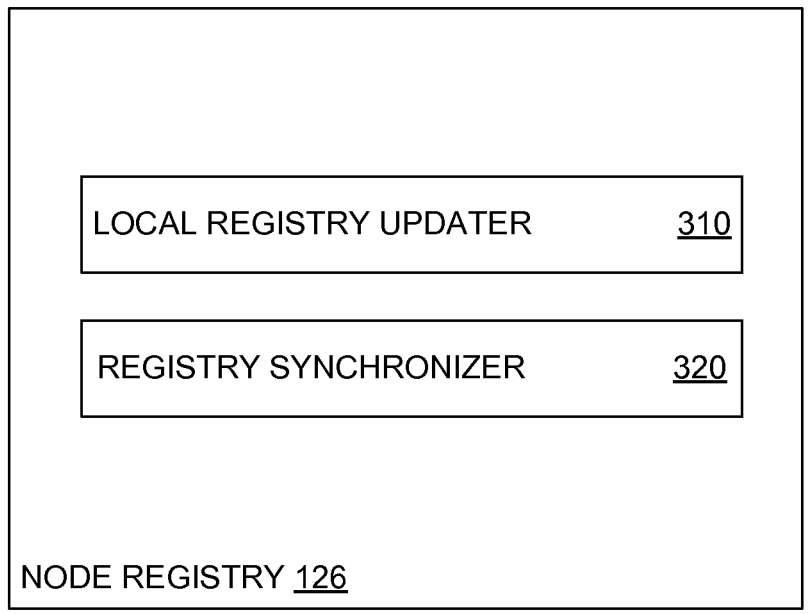
FIG. 3 illustrates a block diagram of an example node registry, according to one embodiment.

FIG. 3 illustrates a block diagram of an example node registry 126, according to an embodiment. Node registry 126 generally includes a local registry updater 310 and a registry synchronizer 320.

Local registry updater 310 updates a local copy of node registry 126 when a software update is applied to a node. As described above, an updated entry for a node may include information about the updated software (e.g., version information, build number, build date, etc.) and when the node was updated. In some cases, local registry updater 310 additionally updates an entry in node registry 126 indicating the most recently updated node for a particular program to allow other nodes to obtain software update packages from the appropriate node.

After local registry updater 310 updates a local copy of node registry 126, registry synchronizer 320 propagates the updated node registry 126 to other nodes in the computing environment. Registry synchronizer 320 may update only the data in the registry that was changed as a result of a software update at a node or may overwrite an old version of a node registry with the updated node registry.

After registry synchronizer 320 synchronizes node registries 126 across nodes 120 in a computing environment, the nodes that have not been updated (e.g., nodes other than the designated master node) compare the updated node registry 126 with a previous version of the node registry. Based on the comparison, a node determines that a software update was performed on a peer node, and the node determines whether or not the update should be propagated based on an update policy, as described above. If the update policy at a node allows an update, or if a system administrator approves the update, the node obtains a software update package, performs a software update, and updates the node registry 126 to reflect the update.

Figure 4:
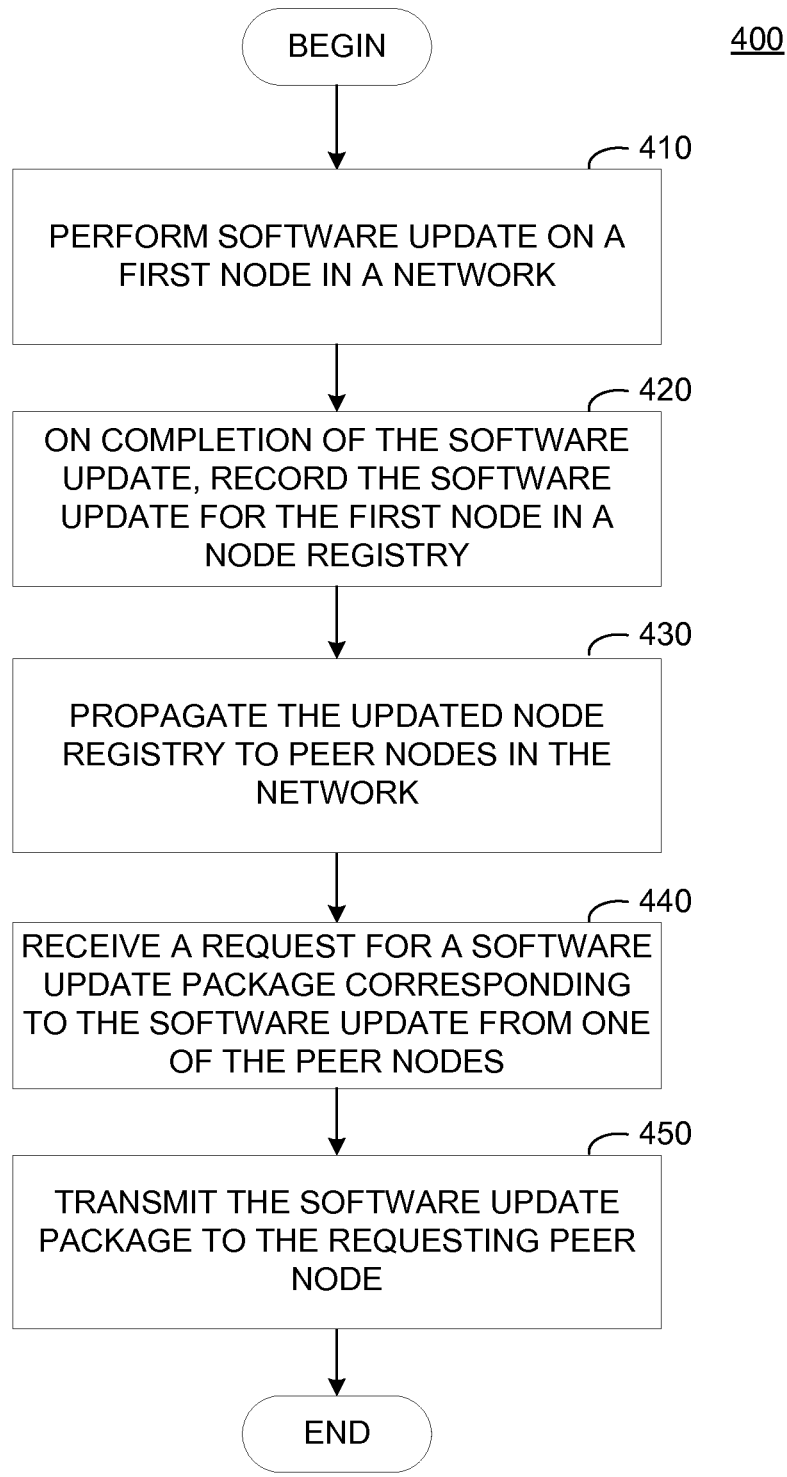
FIG. 4 illustrates an example method for performing a software update on an individual node and propagating the software update to other nodes in a cluster, according to one embodiment.

FIG. 4 illustrates example operations that may be performed by a first node to perform a software update and inform peer nodes that the update was performed on the first node, according to an embodiment. Operations 400 begin at step 410, where a software update is performed on the first node. As discussed above, a first node can obtain a software update package from a remote source or from removable storage accessible on the first node (e.g., from a USB token). After the first node obtains the software update package, the first node performs a software update and stores the software update package in a local repository.

At step 420, after completing the software update, the first node records the software update for the first node in a local copy of a node registry. As discussed above, the first node can update the local copy of the node registry to reflect the software version installed on the first node following the software update, as well as a timestamp indicating when the first node was updated.

At step 430, the first node propagates the updated node registry to peer nodes in the network. As described above, the first node may propagate updates to a node register by updating only the entries in the node register that changed as a result of the software update or by copying the entire node register to each peer node in the network.

By propagating the updated node registry to peer nodes in the network, the update performed at the first node spreads to other nodes in the cluster. Each peer node can participate in the update process based on the updated node registry by determining whether or not the update should be performed at a node based on an update policy for the node and the updated software. If a peer node determines that an update should be performed, at step 440, the first node receives, from a peer node, a request for a software update package corresponding to the software update performed at the first node. At step 450, the first node transmits the software update package to the requesting peer node.

Figure 5:
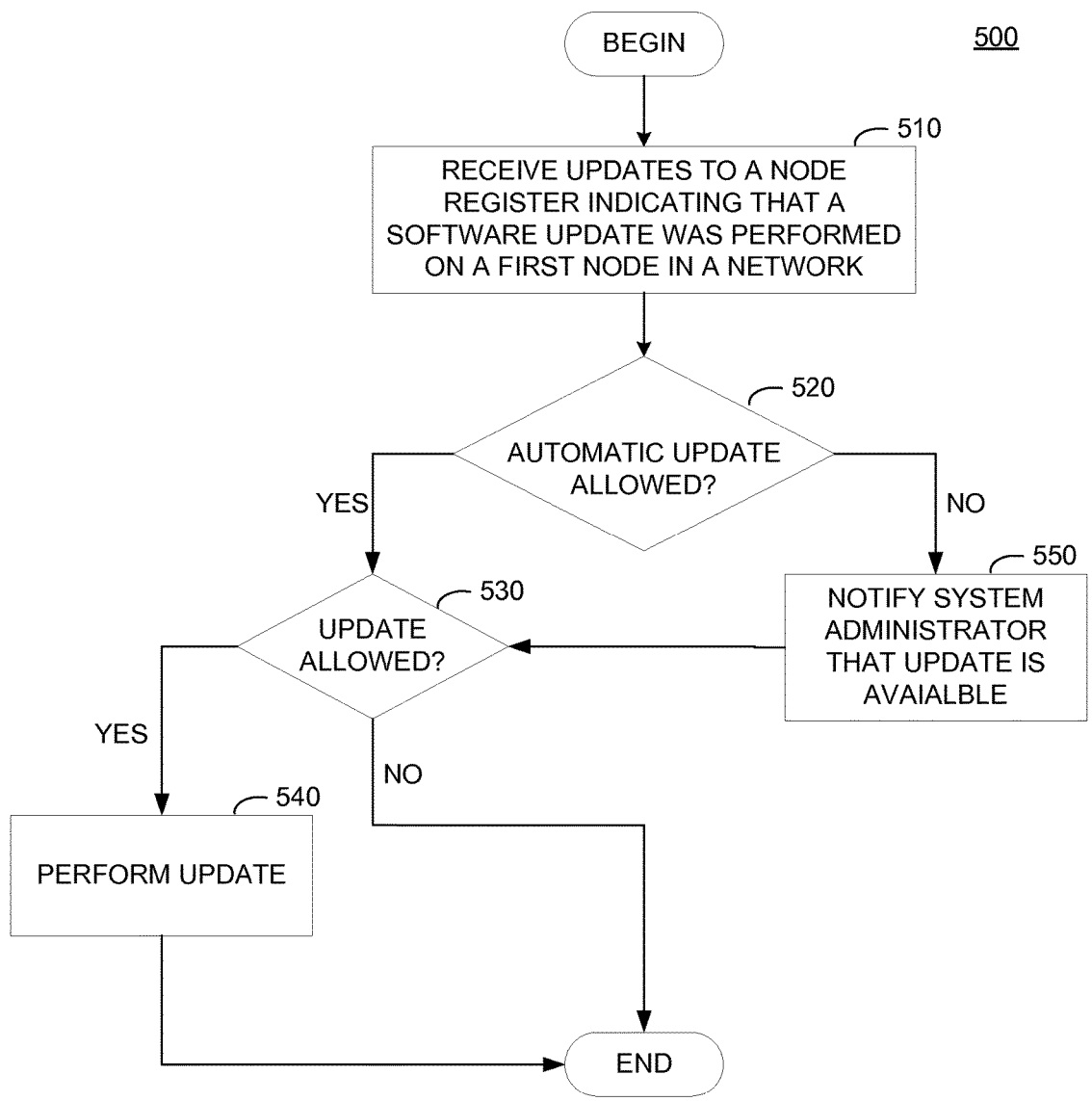
FIG. 5 illustrates an example method for performing a software update at a node based on information about an update performed on another node, according to one embodiment.

FIG. 5 illustrates a method 500 to synchronize a node register and update software on one node based on an update performed at a peer node, according to one embodiment. As shown, the method 500 begins at step 510, where a node receives updates to a node register indicating that a software update was performed on a first node in a network. If a network includes a designated master node, the node receives updates to the node register from the designated master node. Otherwise, if a network does not have a designated master node, the node receives updates to the node register from nodes that have been updated.

At step 520, the node determines whether automatic updates are allowed based on an update policy associated with the node. Update policies may be configured on a per-application and per-machine basis. For example, an update policy may automatically allow security-related updates to be installed, but may require administrator permission for other updates, such as an update from an earlier major version of software to a newer major version of the same program (e.g., upgrading from version 1.x.x to version 1.x.y) or an update from a stable release to a beta version of the same program.

If the update policy allows the node to automatically update software based on an update at a peer node, then at step 530, the node determines whether the update policy allows the update to be performed. The update policy could specify a variety of actions based on whether the software update is an upgrade to a newer version or a downgrade to an older version of software. For example, an update policy could allow updates to be performed if the update is an upgrade to a newer version of software, but may not allow updates to be performed if the update is a downgrade to an older version of software. If the update policy does not allow the update, operations 500 end. Otherwise, the update is allowed, and operations 500 proceed to step 540, in which the node performs an update to bring the software configuration at the node into conformity with the original updated node (e.g., the designated master node). In some cases, when a node performs an update, the node generates an alert, which is logged and/or sent to a system administrator (or group of system administrators) indicating that an update was installed on the node.

If an automatic update is not allowed, then at step 550, the node notifies a system administrator about the availability of the update. The request may be, for example, an e-mail sent by the node to a system administrator (or group of system administrators) identifying the node and the update to be approved. In another case, the request may be provided as an alert in a management console. If the administrator determines that an update is allowed at step 530, then at step 540, the node performs the update.

Figure 6:
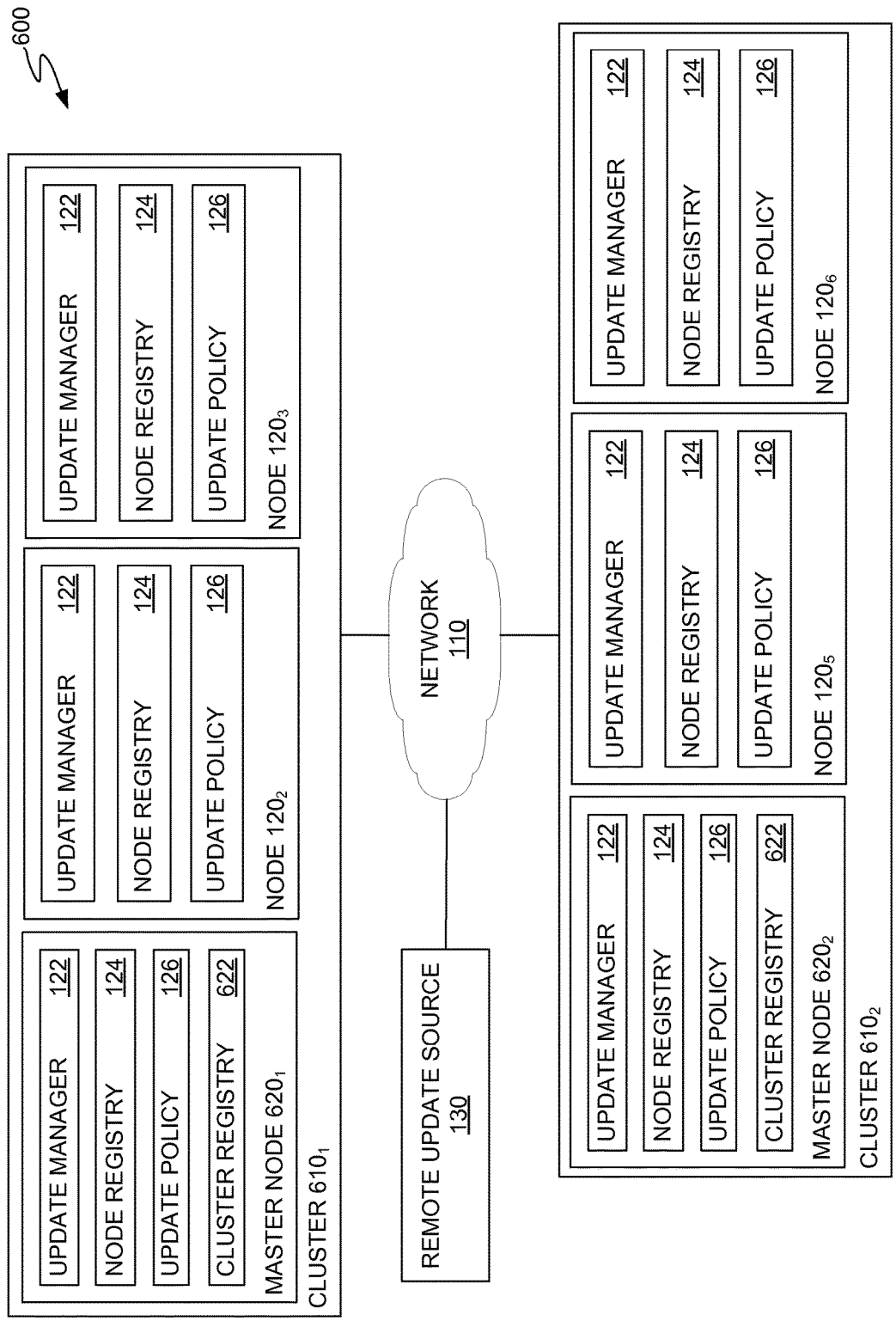
FIG. 6 illustrates an example of a networked computing environment including a plurality of clusters, according to one embodiment.

In some cases, a system administrator manages software updates across multiple clusters of nodes. As illustrated in FIG. 6, a computing environment 600 includes multiple clusters 610 and a remote update source connected to network 110.

Each cluster 610 generally includes a master node 620 and one or more nodes 120. Nodes 120, as discussed above, generally include an update manager 122, node registry 124, and update policy 126. Update manager 122 may obtain software update packages, for example, from a remote update source 130 or from removable storage attached to a node. After a node installs a software update from the obtained software update package(s), the node updates node registry 124, and node registry 124 propagates the updated node registry to other nodes 120 in cluster 610. Based on the updated node registry 124, nodes 120 within a cluster obtain the software update package(s) from a peer node and install the software update according to an update policy 126 associated with node 120.

In some cases, master node 620 maintains information about the software configuration deployed within cluster 610 in cluster registry 622. In some cases, master node 620 may also be the designated master node within a cluster. As software is updated within a cluster 610, master node 620 and/or one or more other nodes 120 can update cluster registry 622 to reflect the most recent software update performed on nodes 120 within cluster 610. For example, cluster registry 622 may include information about the most recent software update deployed in cluster 610, timestamps indicating when each software module or program deployed in cluster 610 was updated, and the location of the software update package(s) for each software module or program deployed in cluster 610. In some cases, cluster registry 622 may contain a copy of node registry 124.

A master node 620 in a cluster 610 contacts a peer node in another cluster to determine whether or not software updates have been deployed in that cluster. For example, master node $620_1$ in cluster $610_1$ contacts the corresponding master node $620_2$ in cluster $610_2$ to obtain information about the software configuration deployed in cluster $610_2$ (e.g., from cluster registry 622). If information from cluster registry 622 at master node $610_2$ indicates that the software configuration deployed in cluster $610_2$ is different from the software configuration deployed in cluster $610_1$, master node $620_1$ may, subject to update policy 126, obtain software update package(s) from master node $620_2$ and perform the software update.

When master node $620_1$ finishes installing the software update from the obtained software update package(s), master node $620_1$ updates a local copy of node registry 124 and cluster registry 622 to reflect the software update. As described above, master node $620_1$ propagates the updated node registry 124 to peer nodes in cluster 610 (e.g., nodes $120_2$ and $120_3$). Based on the update policies 126 associated with each node 120, the update obtained from master node $620_2$ and installed at master node $620_1$ is installed at nodes $120_2$ and $120_3$.

Figure 7:
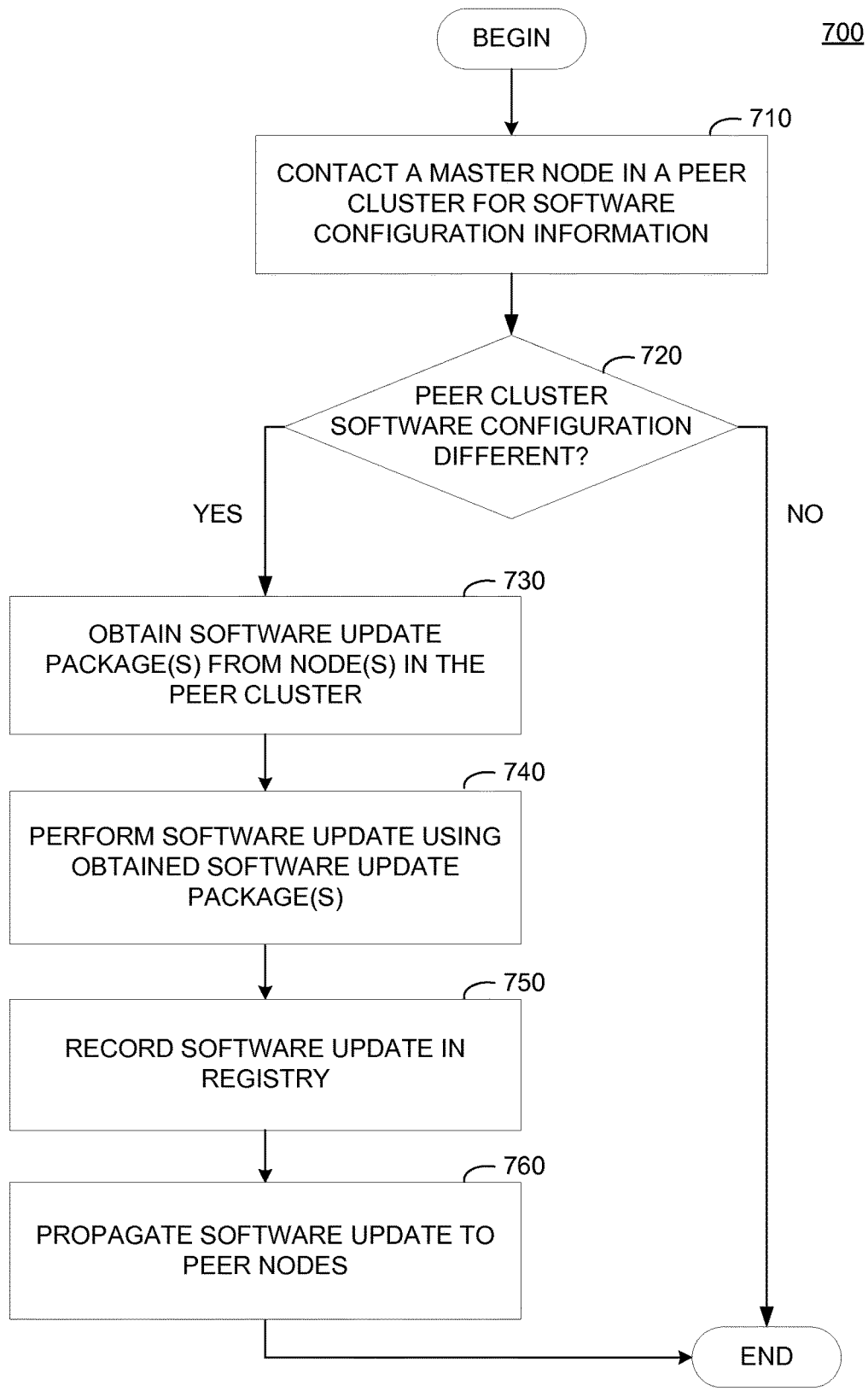
FIG. 7 illustrates an example method for performing a software update within a cluster based on software update information from another cluster, according to one embodiment.

FIG. 7 illustrates a method to update software applications based on a configuration deployed in a peer cluster, according to an embodiment.

As shown, the method 700 begin at step 710, where the master node contacts a node in a peer cluster for information about the software configuration deployed in the peer cluster. As discussed above, a master node can contact the corresponding master node in the peer cluster or any other node in the peer cluster. At step 720, the master node compares its software configuration to the software configuration of the peer cluster. If the master node's software configuration is the same as the software configuration deployed at a peer cluster, operations 700 end.

When the master node's software configuration differs from that of the peer cluster operations the master node obtains one or more software update packages from one or more nodes in the peer cluster at step 730. In some cases, the master node may obtain software update packages from an update manager 122 at a corresponding master node in the peer cluster. In some cases, the master node obtains software update packages from update managers 122 at nodes 120 identified in the software configuration information received from the master node in the peer cluster.

After the master node obtains the software update packages from the peer cluster, where the master node performs software updates using the obtained software update packages at step 740. At step 750, the master node records the software update(s) in a node registry. Because the node registry is replicated across peer nodes in a cluster, updates to the node registry performed by the master node are propagated to peer nodes in the cluster.

At step 760, the software update is propagated from the master node to one or more peer nodes in the cluster. As described above, when peer nodes receive updates to the node registry, each peer node determines whether the update specified by the new version of the node registry is permitted. If the peer node is allowed to perform an update (e.g., through an automatic update policy or manual approval by a system administrator), the peer node requests software update packages from the master node. In response to the request, the master node transmits the requested software update packages (e.g., via update manager 122) to the requesting peer node.

Figure 8:
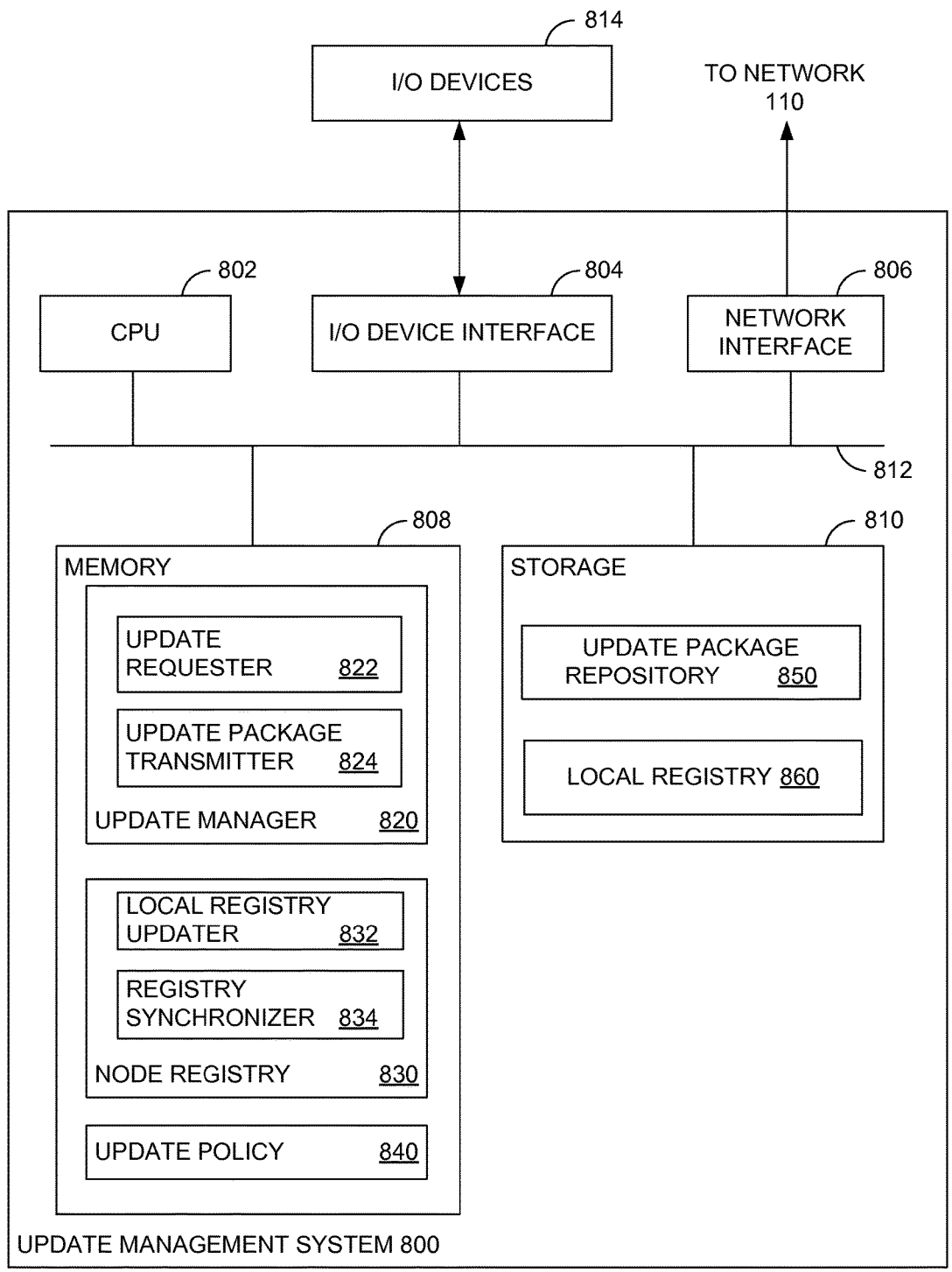
FIG. 8 illustrates an example computing system for peer-based update management, according to one embodiment.

FIG. 8 illustrates an example update management system 800 that uses information about software updates performed at a first node to perform updates at a second peer node, according to an embodiment. As shown, the update management system includes, without limitation, a central processing unit 802, one or more I/O device interfaces 804, which may allow for the connection of various I/O devices 814 (e.g., keyboards, displays, mouse devices, pen input, etc.) to the update management system 800, network interface 806, a memory 808, storage 810, and an interconnect 812.

CPU 802 may retrieve and execute programming instructions stored in the memory 808. Similarly, the CPU 802 may retrieve and store application residing in the memory 808. The interconnect 812 transmits programming instructions and application data among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be a disk drive. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes an update manager 820, a node registry 830, and update policy 840. If update management system 800 is configured as a master node or is otherwise the first node to be updated, update manager 820 may be configured to receive a request from a peer node for an update package. Based on the request, update package transmitter 824 retrieves the requested software update package from storage 810 (e.g., from update package repository 850 in storage 810). Systems 800 that are not configured as a master node may may be configured to request an update package, via update requester 822, from update manager 820 at a peer node (i.e., a designated master node or the first node in a cluster to be updated) and perform an update on system 800 according to an update policy associated with system 800.

Node registry 830 generally includes a local registry updater 832 and a registry synchronizer 834. As discussed above, as updates are installed at system 800, local registry updater 832 updates a local copy of the node registry (i.e., local registry 860) to reflect the software update applied to system 800 (e.g., recording the software version, build number, build date, etc.). After the local copy of the node registry is updated, registry synchronizer 834 propagates the updated local copy of the node registry to peer nodes in the cluster. Peer nodes generally receive the updated node registry and trigger update manager 820 to perform system updates according to an update policy 840 associated with each node.

Update policy 840 defines the actions that update manager 820 can take in response to an update performed at a peer node. As discussed above, update policy 840 can allow for automatic updates, request permission from a system administrator to perform an update, or prevent an update from being installed at the system 800.

As shown, storage 810 includes an update package repository 850 and a local registry 860. Update package repository 850 generally contains update packages for updates installed on system 800. Local registry 860 generally contains a local copy of a node register, which is replicated throughout a cluster of nodes and includes information about software configurations for each node in the cluster (e.g., the versions of software deployed on each node).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

What is claimed is:

1. A method for updating an application on a group of nodes, comprising:
    updating the application at a first node in a first cluster using one or more update packages;
    updating application deployment information in a registry to indicate that an update was performed at the first node;
    propagating the updated application deployment information in the registry from the first node to a second node in a second cluster, wherein the second node comprises a designated master node in the second cluster; and
    upon determining, at one of the one or more second nodes, that one or more application updates have been deployed on and are available at the first node:
        requesting one or more update packages from the first node;
        based on an update policy associated with the second node, updating the application using the one or more update packages; and
        propagating the one or more update packages to one or more other nodes in the second cluster.

2. The method of claim 1, wherein the update policy indicates that updates are to be performed automatically.

3. The method of claim 1, wherein the update policy indicates that updates are to be performed based on authorization by a system administrator.

4. The method of claim 3, wherein the determining if the one or more application updates are to be performed on the second node comprises:
    transmitting a request to allow the one or more application updates to the system administrator, and
    receiving a response to the request indicating whether or not the one or more application updates are allowed.

5. The method of claim 1, wherein the update policy comprises:
    a first policy related to upgrades to a newer version of the application; and
    a second policy related to downgrades to a previous version of the application.

6. The method of claim 1, wherein the first node comprises a designated master node.

7. A computer program product, comprising:
    a computer-readable storage medium having computer readable program code embodied therewith, the computer readable program code configured to perform an operation for updating an application on a group of nodes, the operation comprising:
    updating the application at a first node in a first cluster using one or more update packages;
    updating application deployment information in a registry to indicate that an update was performed at the first node;
    propagating the updated application deployment in the registry from the first node to a second node in a second cluster, wherein the second node comprises a designated master node in the second cluster; and
    upon determining, at one of the one or more second nodes, that one or more application updates have been deployed on and are available at the first node:
        requesting one or more update packages from the first node;
        based on an update policy associated with the second node, updating the application using the one or more update packages; and
        propagating the one or more update packages to one or more other nodes in the second cluster.

8. The computer program product of claim 7, wherein the update policy indicates that updates are to be performed based on authorization by a system administrator.

9. The computer program product of claim 8, wherein the determining if the one or more application updates are to be performed on the second node comprises:
    transmitting a request to allow the one or more application updates to the system administrator; and
    receiving a response to the request indicating whether or not the one or more application updates are allowed.

10. The computer program product of claim 7, wherein the update policy comprises:
    a first policy related to upgrades to a newer version of the application; and a second policy related to downgrades to a previous version of the application.

11. A system, comprising:
a processor; and
a memory storing one or more instructions, which, when executed by the processor, performs an operation for updating an application on a group of nodes, the operation comprising:
   updating the application at a first node in a first cluster using one or more update packages;
   updating application deployment information in a registry to indicate that an update was performed at the first node;
   propagating the updated application deployment information in the registry from the first node to a second node in a second cluster, wherein the second node comprises a designated master node in the second cluster; and
   upon determining, at one of the one or more second nodes, that one or more application updates are available at the first node:
      requesting one or more update packages from the first node;
      based on an update policy associated with the second node, updating the application using the one or more update packages; and
      propagating the one or more update packages to one or more other nodes in the second cluster.

12. The system of claim 11, wherein the update policy indicates that updates are to be performed based on authorization by a system administrator.

13. The system of claim 12, wherein the determining if the one or more application updates are to be performed on the second node comprises:
   transmitting a request to allow the one or more application updates to the system administrator; and
   receiving a response to the request indicating whether or not the one or more application updates are allowed.

14. The system of claim 11, wherein the update policy comprises:
   a first policy related to upgrades to a newer version of the application; and
   a second policy related to downgrades to a previous version of the application.

* * * * *